United States Patent
Lee et al.

(10) Patent No.: US 10,807,432 B2
(45) Date of Patent: Oct. 20, 2020

(54) VEHICLE HEIGHT ADJUSTMENT APPARATUS FOR SUSPENSION

(71) Applicants: HYUNDAI MOTOR COMPANY, Seoul (KR); KIA MOTORS CORPORATION, Seoul (KR); Hyundai Mobis Co., Ltd., Seoul (KR)

(72) Inventors: Sang Hoon Lee, Yongin-si (KR); Won Hyok Choi, Seoul (KR)

(73) Assignees: Hyundai Motor Company, Seoul (KR); Kia Motors Corporation, Seoul (KR); Hyundai Mobis Co., Ltd., Seoul (KR)

(*) Notice: Subject to any disclaimer, the term of this patent is extended or adjusted under 35 U.S.C. 154(b) by 223 days.

(21) Appl. No.: 16/190,879

(22) Filed: Nov. 14, 2018

(65) Prior Publication Data

US 2020/0070612 A1    Mar. 5, 2020

(30) Foreign Application Priority Data

Aug. 29, 2018  (KR) .................. 10-2018-0102304

(51) Int. Cl.
*B60G 17/015* (2006.01)
*F16H 25/20* (2006.01)
(Continued)

(52) U.S. Cl.
CPC .......... *B60G 17/0157* (2013.01); *B60G 11/14* (2013.01); *B60G 13/08* (2013.01); *B60G 15/063* (2013.01); *B60G 15/065* (2013.01); *F16H 25/20* (2013.01); *B60G 2202/42* (2013.01); *B60G 2202/44* (2013.01); *B60G 2500/30* (2013.01);
(Continued)

(58) Field of Classification Search
CPC .................. B60G 17/0157; B60G 15/065; B60G 15/062; B60G 15/063; B60G 15/04; F16H 25/02; F16H 2025/2078; F16H 2025/204
See application file for complete search history.

(56) References Cited

U.S. PATENT DOCUMENTS 8,127,900 B2 * 3/2012 Inoue .................. B60G 15/067
                                                     188/267
8,398,091 B2 * 3/2013 Inoue .................... B60G 17/06
                                                     280/5.507
(Continued)

FOREIGN PATENT DOCUMENTS

DE    102006061919 A1 * 11/2007 ........... B60G 15/065
DE    102009022810 A1 * 12/2010 ............. F16F 1/047
(Continued)

*Primary Examiner* — James A English
(74) *Attorney, Agent, or Firm* — Morgan, Lewis & Bockius LLP (57) ABSTRACT

A vehicle height adjustment apparatus for a suspension according to an exemplary embodiment of the present disclosure includes: a piston rod having a thread on an outer circumferential surface thereof; a shock absorber in which the piston rod is installed to be movable up and down; a top mount connecting the piston rod to a vehicle body; a first spring having one side connected to the top mount and a remaining side connected to the shock absorber; a second spring having one side connected to the shock absorber; and a driving module connected to a remaining side of the second spring and installed to be movable on the piston rod by being fastened to the thread of the piston rod.

17 Claims, 4 Drawing Sheets

(51) Int. Cl.
  *B60G 11/14* (2006.01)
  *B60G 15/06* (2006.01)
  *B60G 13/08* (2006.01)

(52) U.S. Cl.
  CPC .. *B60G 2800/914* (2013.01); *F16H 2025/204* (2013.01); *F16H 2025/2078* (2013.01)

(56) References Cited

U.S. PATENT DOCUMENTS

| | | | | |
|---|---|---|---|---|
| 8,544,620 B2* | 10/2013 | Inoue | ............ | F16F 15/03 188/297 |
| 2008/0111334 A1* | 5/2008 | Inoue | ............ | B60G 17/021 280/124.1 |
| 2013/0200589 A1* | 8/2013 | Cox | ............ | B60G 15/065 280/124.162 |
| 2019/0315181 A1* | 10/2019 | Lee | ............ | B60G 17/0272 |

FOREIGN PATENT DOCUMENTS

| | | | | |
|---|---|---|---|---|
| FR | 3007478 A1 * | 12/2014 | ............ | B60G 11/14 |
| KR | 10-2013-0041676 A | 4/2013 | | |
| WO | WO-2017024103 A1 * | 2/2017 | ............ | F16H 25/20 |

* cited by examiner

VEHICLE HEIGHT ADJUSTMENT APPARATUS FOR SUSPENSION

CROSS REFERENCE TO RELATED APPLICATION

The present application is based on and claims the benefit of priority to Korean Patent Application No. 10-2018-0102304, filed Aug. 29, 2018, the entire contents of which is incorporated herein for all purposes by this reference.

TECHNICAL FIELD

The present disclosure relates to a vehicle height adjustment apparatus for a suspension, and more particularly, to a vehicle height adjustment apparatus for a suspension, which is installed in the suspension to be capable of adjusting the height of a vehicle body by adjusting a distance between a wheel and the vehicle body.

BACKGROUND

During the traveling of a vehicle, when a road surface condition is poor or when the vehicle travels on a curve, shock may be transmitted to the interior space of the vehicle or a leaning phenomenon may occur. A suspension is installed to absorb and mitigate the shock and leaning phenomenon so as to improve ride comfort and reduce noise introduced into the interior space.

On the other hand, when the vehicle travels at a high speed, it is advantageous to lower the height of the vehicle body in order to reduce air resistance. Further, when the vehicle runs on a rough road, it is advantageous to raise the height of the vehicle body in order to prevent damage to the lower portion of the vehicle body.

Accordingly, a vehicle height adjustment apparatus for a suspension (hereinafter, also referred to as a "vehicle height adjustment apparatus") capable of variably adjusting the height of a vehicle body has been developed and applied in order to cope with various driving environments.

In the related art, a pneumatic vehicle height adjustment apparatus has been widely used, which adjusts the height of a vehicle body using pneumatic pressure mainly generated by engine power. However, since such a pneumatic suspension structure directly uses engine power, fuel consumption and output power may be reduced. Further, when the pneumatic pressure leaks due to a defective or damaged component or the like, the vehicle body may collapse without maintaining the height thereof.

Further, in the pneumatic suspension structure, since the components for forming and maintaining air pressure have a large volume, there is a limitation in that the pneumatic suspension structure can be applied only to a multi-link-type suspension. Accordingly, there has been a problem in that the above-described pneumatic vehicle height adjustment apparatus is not applicable to a vehicle, which is equipped with a suspension of a type using a shock absorber widely installed in a small or medium-sized vehicle, or it is not easy to design the component layout even if the pneumatic vehicle height adjustment apparatus is applied.

Therefore, there is a need for a vehicle height adjustment apparatus having a new structure capable of solving the above-mentioned problems.

The matters described above as the background art are provided merely for the purpose of promoting an understanding of the background of the present disclosure, and the foregoing description of the background art should not be construed as admitting that the above-described matters correspond to the prior art, which has already been known to those skilled in the art.

SUMMARY

The present disclosure has been made to solve the problems described above, and an aspect of the present disclosure is to provide a vehicle height adjustment apparatus for a suspension which is simplified in system and minimized in cost.

In order to achieve the aspects described above, a vehicle height adjustment apparatus according to an exemplary embodiment of the present disclosure includes: a piston rod having a thread on an outer circumferential surface thereof; a shock absorber in which the piston rod is installed to be movable up and down; a top mount connecting the piston rod to a vehicle body; a first spring having one side connected to the top mount and a remaining side connected to the shock absorber; a second spring having one side connected to the shock absorber; and a driving module connected to a remaining side of the second spring and installed to be movable on the piston rod by being fastened to the thread of the piston rod.

The driving module may be configured to adjust a vehicle height by compressing or tensioning the second spring to change load applied to the first spring, which allows the first spring to be compressed or tensioned.

The driving module may include a screw nut fastened to the thread of the piston rod, a motor configured to rotate the screw nut, a case in which the motor is installed, and a guide protruding from an inner surface of the case towards the piston rod, and a guide groove may be provided in the piston rod in a longitudinal direction of the piston rod.

The first spring, the second spring, the motor, and the case may surround a periphery of the piston rod.

The guide may be inserted into the guide groove so as to prevent the case from rotating relative to the piston rod.

The motor may be coupled to an outer surface of the screw nut so as to rotate the screw nut.

The driving module may further include a second spring seat provided so as to be rotatable integrally with the second spring and configured to support the remaining side of the second spring, and a second spring bearing installed between the case and the second spring seat so as to make the second spring seat rotatable with reference to the case.

The driving module may further include a case bearing installed between the screw nut and an inner side of the case.

The case bearing may include a first case bearing and a second case bearing, and the motor may be installed inside the case and disposed between the first case bearing and the second case bearing.

The driving module may further include a seat bearing interposed between the case and the second spring seat so as to reduce friction.

The vehicle height adjustment apparatus may further include a top mount bearing installed below the top mount and connected to the remaining side of the first spring.

The vehicle height adjustment apparatus may further include a first spring seat installed below the top mount bearing so as to support the remaining side of the first spring, and a dust cover having one side connected to the first spring seat and a remaining side located adjacent to an outer surface of the driving module.

The dust cover may be provided in a bellows shape so as to prevent external foreign matter from infiltrating into a contact portion between the driving module and the piston rod.

The second spring may have a diameter different from a diameter of the first spring.

The second spring may be provided as a helical coil spring disposed inside the first spring to surround the shock absorber and the piston rod.

The first spring is provided as a helical coil spring so as to surround the shock absorber and the piston rod.

A diameter of a central portion of the first spring is larger than diameters of opposite end portions of the first spring.

With a vehicle height adjustment apparatus for a suspension according to the present disclosure, the following effects can be obtained.

First, it is possible to reduce fuel consumption by adjusting the vehicle height without pneumatic pressure generated using engine power.

Second, it is possible to improve high-speed stability and handling characteristics by lowering the center of gravity by lowering the garage during high speed driving, and to fuel consumption by reducing air resistance.

Third, since the vehicle height adjustment has a simple layout, it is possible to install the vehicle height adjustment apparatus without interference of peripheral components.

Fourth, it is possible to provide a vehicle height adjustment apparatus, which is applicable to a suspension including a shock absorber.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Terminologies used herein are used for the purpose of describing particular embodiments only and are not intended to limit the present disclosure. Singular terms used herein also include the meaning of plural terms unless explicitly stated otherwise in context. The term, "including", is used herein in order to specify a certain feature, region, integer, step, operation, element and/or component, and does not exclude existence or addition of another certain feature, region, integer, step, operation, element, component, and/or group.

Unless defined otherwise, all terms including technical and scientific terms used herein have the same meaning as commonly understood by a person ordinarily skill in the art to which the present disclosure belongs. Terms with meanings defined in commonly used dictionaries are further construed to have meanings consistent with the present disclosure and related technical literatures, and are not to be construed as having ideal or highly formal meanings unless defined otherwise.

Hereinafter, a vehicle height adjustment for a suspension according to an exemplary embodiment of the present disclosure will be described with reference to the accompanying drawings.

Figure 1:
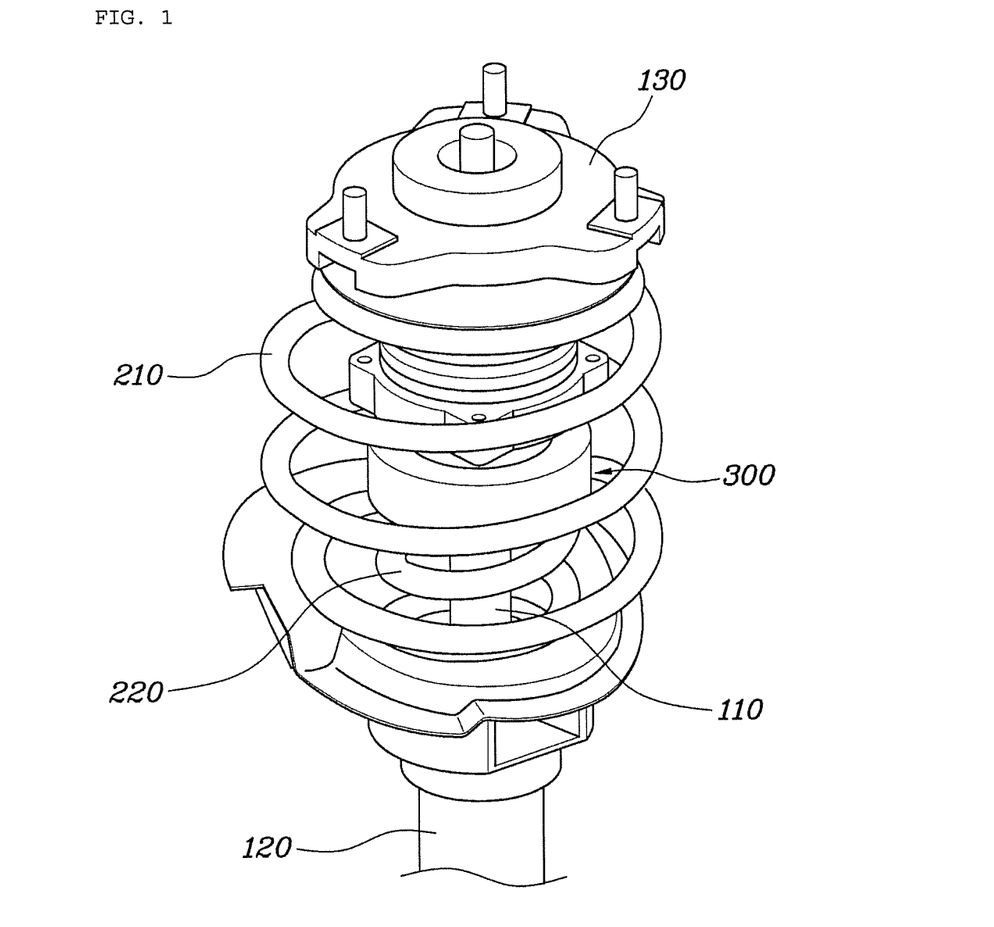
FIG. 1 is a perspective view illustrating a vehicle height adjustment apparatus for a suspension according to an exemplary embodiment of the present disclosure.
Figure 2:
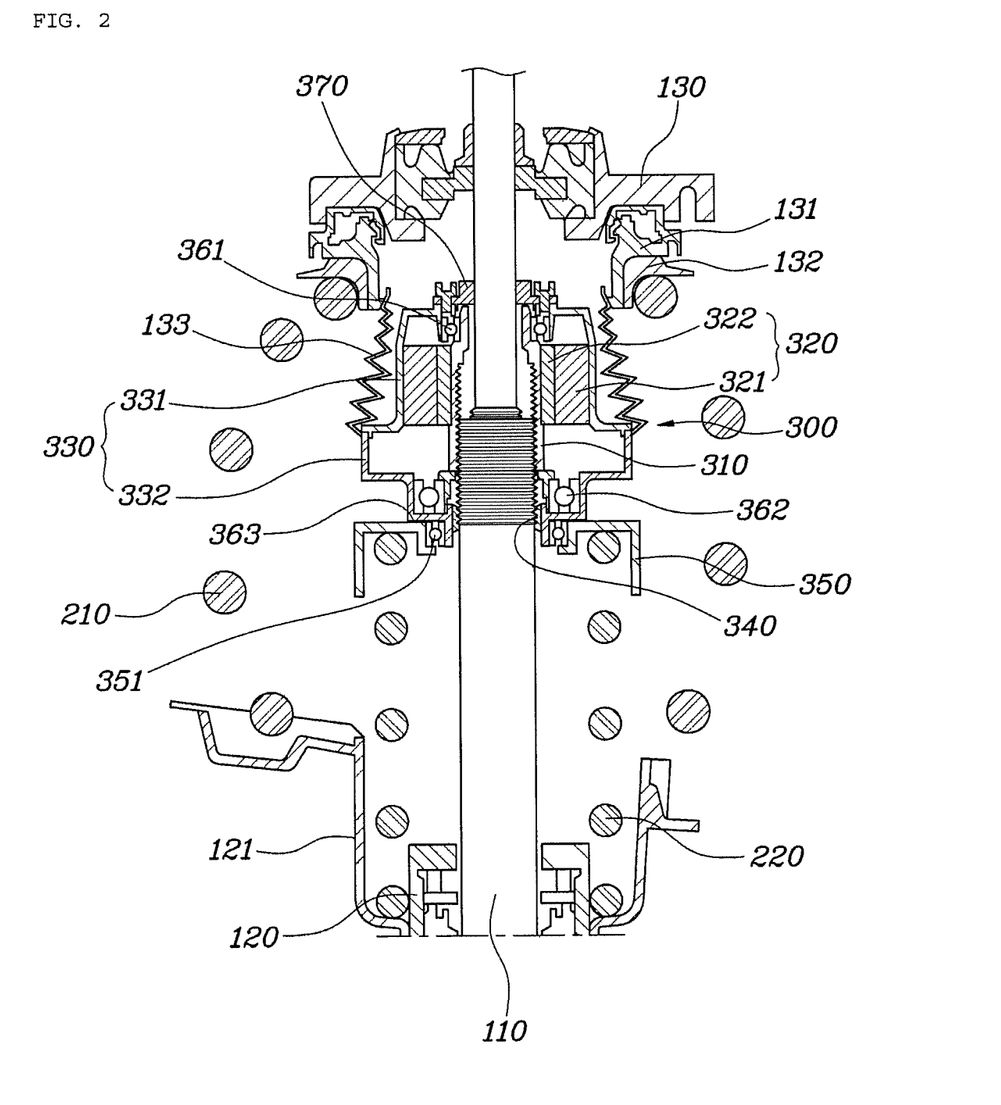
FIG. 2 is a cross-sectional view illustrating the vehicle height adjustment apparatus for a suspension according to an exemplary embodiment of the present disclosure.
Figure 3:
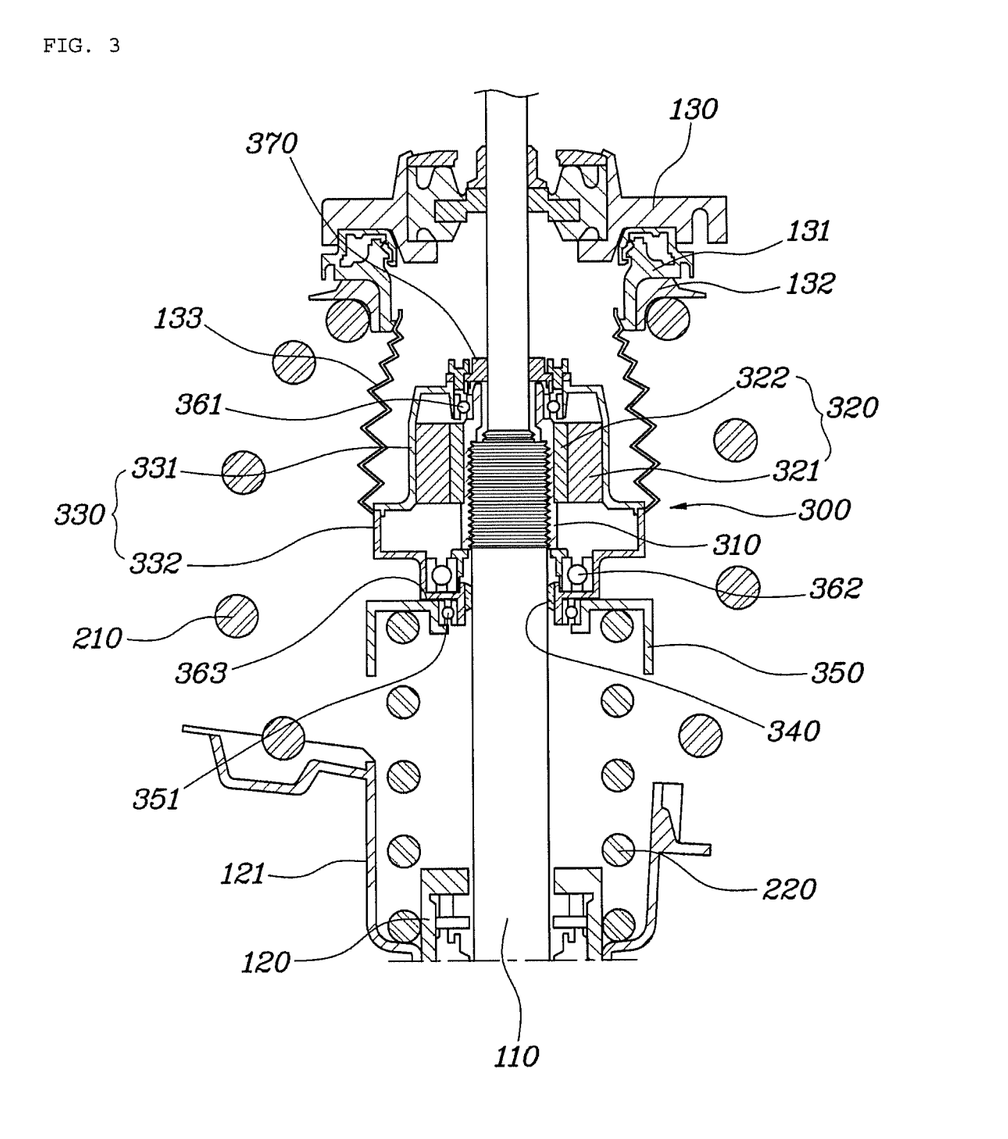
FIG. 3 is a view illustrating a state in which a vehicle height is raised by operating the vehicle height adjustment apparatus for a suspension according to an exemplary embodiment of the present disclosure.
Figure 4:
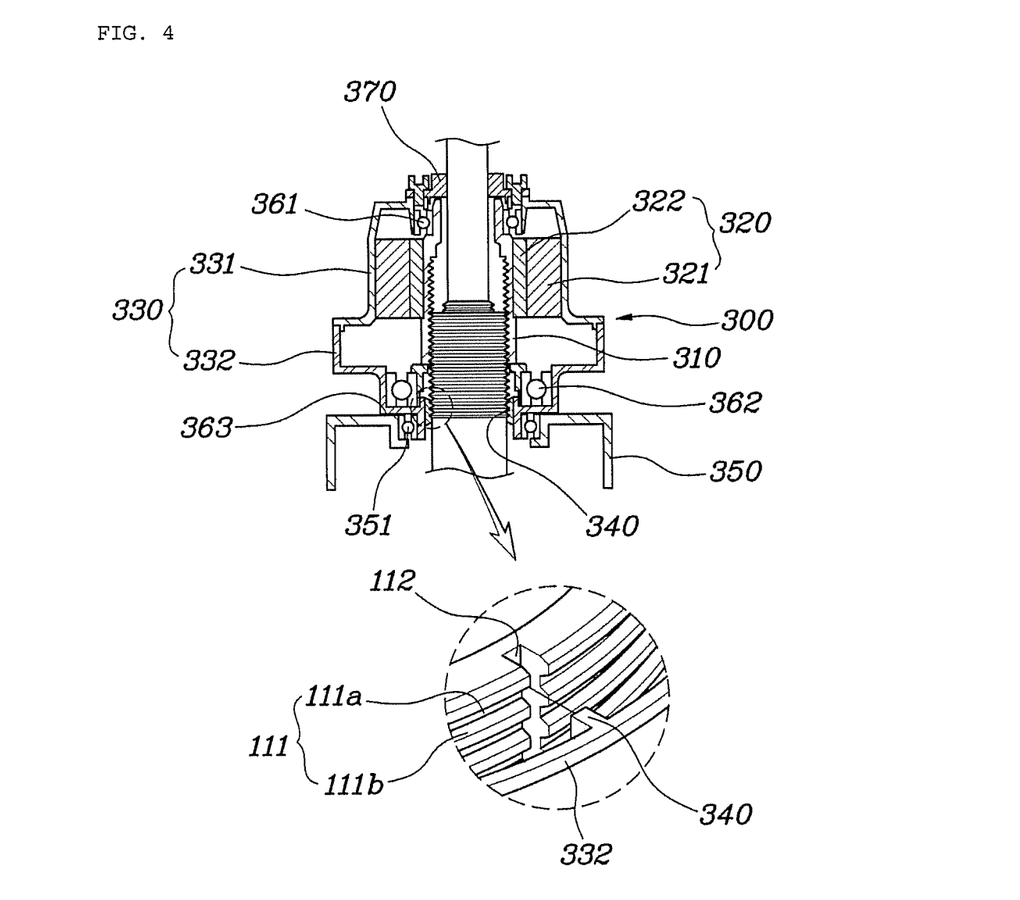
FIG. 4 is a view illustrating a guide and a guide groove for preventing rotation of a case.

FIG. 1 is a perspective view illustrating a vehicle height adjustment apparatus for a suspension according to an exemplary embodiment of the present disclosure, FIG. 2 is a cross-sectional view illustrating the vehicle height adjustment apparatus for a suspension according to an exemplary embodiment of the present disclosure, FIG. 3 is a view illustrating a state in which a vehicle height is raised by operating the vehicle height adjustment apparatus for a suspension according to an exemplary embodiment of the present disclosure, and FIG. 4 is a view illustrating a guide and a guide groove for preventing rotation of a case.

As illustrated in FIGS. 1 to 4, a vehicle height adjustment apparatus according to an exemplary embodiment of the present disclosure includes a piston rod 110, a shock absorber 120, a top mount 130, a first spring 210, a second spring 220, and a driving module 300.

The piston rod 110 is installed on the shock absorber 120 to be movable up and down and to elastically connect a wheel and a vehicle body. That is, when an impact is applied to the wheel, the impact amount is transmitted to the shock absorber 120, and then the piston rod 110 is retracted into or extended from the piston of the shock absorber 120 to attenuate the impact amount, thereby suppressing vibration and shaking transmitted to the vehicle body to a minimum.

In the meantime, the piston rod 110 according to an exemplary embodiment of the present disclosure has threads 111 provided on an outer circumferential surface thereof. As described later in detail, by the screw threads 111 provided on the outer circumferential surface of the piston rod 110, the piston rod 110 may be engaged with the drive module 300 in the form of a screw shaft.

The top mount 130 is fixed to the vehicle body (not illustrated) and is connected to an end of the piston rod 110. That is, the top mount 130 restrains the end of the piston rod 110 from moving in the up-and-down direction and the right-left direction, and does not interfere with rotation of the piston rod 110 when the piston rod 110 rotates together with a wheel according to the steering operation.

A first spring seat 132 is provided below the top mount 130 and a top mount bearing 131 is provided between the top mount 130 and the first spring seat 132 such that the first spring seat 132 is rotatably coupled to the top mount 130. The first spring seat 132 is coupled to the upper end of the first spring 210 so as to rotate integrally with the first spring 210.

The top mount 130, and the top mount bearing 131 and the first spring seat 132 coupled to the top mount 130 may have various modified layouts depending on the shapes of the vehicle body and peripheral components. Therefore, the specific shapes thereof are not particularly limited in the present disclosure.

The upper end of the first spring 210 is connected to the top mount 130 and the lower end of the first spring 210 is connected to the shock absorber 120. At this time, the upper end of the first spring 210 is rotatably coupled to the top mount 130 by being connected to the first spring seat 132, which is rotatably coupled to the top mount 130.

When the shock absorber 120 rotates together with the wheel during the steering operation, the first spring 210 integrally coupled to the shock absorber 120 rotates therewith, so that the upper end of the first spring 210 should be connected to the top mount 130 to be relatively movable.

The first spring 210 is installed in order to attenuate the impact amount transmitted from the wheel to the vehicle body together with the shock absorber 120 and the piston rod 110. In order to make the piston rod 110 maintain a proper position within the piston of the shock absorber 120, the first spring 210 elastically supports the shock absorber 120 and the top mount 130 therebetween.

The first spring 210 is provided as a helical coil spring so as to surround the shock absorber 120 and the piston rod 110. In the first spring 210, the diameter of the central portion may be larger than those of the opposite ends.

The upper end of the second spring 220 is rotatably coupled to the driving module 300, and the lower end of the second spring 220 is coupled to the shock absorber 120.

At this time, the second spring 220 may be formed to have a diameter different from that of the first spring 210. Preferably, the second spring 220 may be provided as a helical coil spring disposed inside the first spring 210 to surround the shock absorber 120 and the piston rod 110.

The second spring 220 may be compressed or tensioned according to the operation of the driving module 300 to be described later, whereby the vehicle height can be changed.

The driving module 300 is a core configuration of the present disclosure, and is fastened to the threads of the piston rod 110 so as to movable up and down along the piston rod 110.

When the driving module 300 moves up or down, the upper end of the second spring 220 connected to the driving module 300 also moves up or down therewith. The lower end of the second spring 220 is fixed to the shock absorber 120. As a result, the second spring 220 can be tensioned or compressed as the driving module 300 moves up and down.

The second spring 220 is elastically interposed between the driving module 300 and the shock absorber 120. Since the driving module 300 is fastened to the threads of the piston rod 110, the driving module 300 is consequently connected the top mount 130 through the piston rod 110. That is, the second spring 220 is indirectly interposed between the top mount 130 and the shock absorber 120.

Generally, the more a spring is compressed, the more the elastic repulsive force increases. Therefore, when the second spring 220 is compressed such that and the elastic force thereof is increased, the second spring 220 pushes the top mount 130 and the shock absorber 120 more strongly. Therefore, the load applied to the first spring 210 installed between the top mount 130 and the shock absorber 120 is reduced.

Accordingly, when the driving module 300 is lowered and the second spring 220 is compressed, the first spring 210, to which the reduced load is applied, is tensioned to increase the length thereof, whereby the distance between the shock absorber 120 and the top mount 130 is increased and thus the distance between the wheel and the vehicle body is increased, resulting in an increase in the vehicle height.

More specifically, the driving module 300 may include: a screw nut 310, which is engaged with the threads 111 of the piston rod 110 to be movable in the longitudinal direction of the piston rod 110 while rotating; a motor 320, which is in contact with the outer surface of the screw nut 310 and rotates the screw nut relative to the piston rod 110 so as to move up and down the screw nut 310; a case 330 configured to support the motor 320 while surrounding the peripheral portion of the screw nut 310 and the motor 320; and a guide 340 protruding from the inner surface of the case 330 towards the screw nut 310 to restrain the case 330 not to rotate in the circumferential direction of the piston rod 110.

Further, a guide groove 112 is formed on the outer circumferential surface of the piston rod 110 separately from the threads 111. The guide groove 112 is elongated in the longitudinal direction of the piston rod 110 and is formed deeper than the depth of the threads 111, which include peaks 111*b* and valleys 111*a*.

The guide 340 is inserted into the above-mentioned guide groove 112 and moves along the guide groove 112 so as to allow the entire driving module 300 to move only in the longitudinal direction of the piston rod 110, i.e., in the up-and-down direction. Since the width of the guide groove 112 is substantially equal to the width of the guide 340, the drive module 300 is restrained so as not to rotate in the circumferential direction of the piston rod 110.

The driving module 300 may be provided with a second spring seat 350, which is installed at the lower end of the case 330 and coupled to the upper end of the second spring 220. The second spring seat 350 is integrally coupled to the second spring 220. When the shock absorber 120 is rotated during the steering operation, the second spring 220 and the second spring seat 350 are also integrally rotated.

A second spring bearing 351 and a seat bearing 363 are installed between the case 330 and the second spring seat 350. The second spring bearing 351 is interposed between the outer surface of the case 330 and the inner surface of the second spring seat 350, and thus the second spring seat 350 is connected to be rotatable with reference to the case 330.

In addition, the seat bearing 363 is interposed between the lower surface of the case 330 and the upper surface of the second spring seat 350 so as to reduce the friction between the case 330 and the second spring seat 350. The seat bearing may be provided in the form of a washer made of, for example, a low friction material.

As a result, the surface of the case 330, which is in contact with the second spring seat 350, has a clamp shape such that the case 330 is supported by the second spring bearing 351 in the lateral direction thereof and is supported by the seat bearing 363 in the longitudinal direction thereof.

A first case bearing 361 and a second case bearing 362 are installed inside the case 330 of the driving module 300 so as to support the upper and lower ends of the screw nut 310, respectively, thereby making the screw nut 310 rotatable independently from the case 330. At this time, the motor 320 is installed in the central portion of the case 330. The first case bearing 361 is interposed between the upper portion of the case 330 and the upper portion of the screw nut 310 at the upper side of the motor, and the second case bearing 362 is interposed between the lower portion of the case 330 and the lower portion of the screw nut 310 at the lower side of the motor.

The motor 320 is provided as a hollow motor including a stator 321 fixed to the case 330 and a rotor 322 disposed inside the stator 321 to be in contact with the outer surface of the screw nut 310. Since the first case bearing 361 and the second case bearing 362 support the screw nut 310, the motor 320 is capable of rotating the screw nut 310 more easily.

When the motor 320 rotates the screw nut 310, the screw nut 310 moves in the longitudinal direction of the piston rod 110 while rotating along the threads of the piston rod 110, and the case 330 coupled to the screw nut 310 also moves in the longitudinal direction of the piston rod 110.

At this time, since the case 330 is restrained not to rotate in the circumferential direction of the piston rod 110 through the guide 340, it is possible to prevent a spinning phenomenon in which the rotor 322 of the motor 320 is fixed to the piston rod 110 together with the screw nut 310 and the stator 321 is rotated.

Further, the case 330 may be manufactured as a single body, but may be divided into an upper case 330 and a lower case 330. When the case 330 is manufactured as a single body, manufacturing and distribution costs or the like can be reduced, and when the case 330 is divided into the upper case 330 and the lower case 330, assemblability can be improved.

In addition, a dust cover 133 interposed between the first spring seat 132 and the case 330 may be further included.

The dust cover 133 is provided in the form of a bellows that is made of rubber or plastic to be stretched or contracted as the driving module 300 is moved up and down, and prevents external foreign matter from infiltrating into a connection portion between the driving module 300 and the piston rod 110.

Particularly, the dust cover 133 may be installed in order to prevent foreign matter from adhering to the threads 111 formed on the outer circumferential surface of the piston rod 110, thereby preventing a problem that causes the driving module 300 not to run on the piston rod 110.

Hereinafter, an operation relationship of the vehicle height adjustment apparatus according to an exemplary embodiment of the present disclosure will be described.

When the motor 320 rotates the screw nut 310 in one direction in the state in which the vehicle height is in the normal or low state as illustrated in FIG. 2, the screw nut 310 moves downwards so as to compress the second spring 220 as illustrated in FIG. 3. When the elastic force of the second spring 220 is increased thereby, the load applied to the second spring 220 between the top mount 130 and the shock absorber 120 is increased, whereby the load applied to the first spring 210 is decreased.

When the load applied to the first spring 210 decreases, the first spring 210 is tensioned and the distance between the top mount 130 and the shock absorber 120 increases. As a result, the top mount 130 moves up, thereby raising the vehicle height.

When lowering the vehicle height, the motor 320 moves the screw nut 310 upwards while rotating the screw nut 310 in the opposite direction, thereby compressing the first spring 210 while tensioning the second spring 220. As a result, the top mount 130 is lowered, thereby lowering the vehicle height.

Although the embodiments of the present disclosure have been described with reference to the accompanying drawings, it can be understood by a person ordinarily skilled in the art that the present disclosure may be embodied in other specific forms without departing from the technical spirit or essential features thereof.

Thus, it should be understood that the embodiments described above are illustrative in all aspects and not restrictive. The scope of the present description is defined by the appended claims rather than the detailed description above, and all changes or modifications derived from the meaning and scope of the claims and equivalents thereof should be interpreted as being included in the scope of the present disclosure.

What is claimed is:

1. A vehicle height adjustment apparatus for a suspension, comprising:
    a piston rod having a thread on an outer circumferential surface thereof;
    a shock absorber in which the piston rod is installed to be movable up and down;
    a top mount connecting the piston rod to a vehicle body;
    a first spring having one side connected to the top mount and a remaining side connected to the shock absorber;
    a second spring having one side connected to the shock absorber; and
    a driving module connected to a remaining side of the second spring and installed to be movable on the piston rod by being fastened to the thread of the piston rod.

2. The vehicle height adjustment apparatus of claim 1, wherein the driving module is configured to adjust a vehicle height by compressing or tensioning the second spring to change load applied to the first spring, which allows the first spring to be compressed or tensioned.

3. The vehicle height adjustment apparatus of claim 1, wherein the driving module comprises a screw nut fastened to the thread of the piston rod, a motor configured to rotate the screw nut, a case having in which the motor is installed, and a guide protruding from an inner surface of the case towards the piston rod, and
    a guide groove is provided in the piston rod in a longitudinal direction of the piston rod.

4. The vehicle height adjustment apparatus of claim 3, wherein the first spring, the second spring, the motor, and the case surround a periphery of the piston rod.

5. The vehicle height adjustment apparatus of claim 3, wherein the guide is inserted into the guide groove so as to prevent the case from rotating relative to the piston rod.

6. The vehicle height adjustment apparatus of claim 3, wherein the motor is coupled to an outer surface of the screw nut so as to rotate the screw nut.

7. The vehicle height adjustment apparatus of claim 3, wherein the driving module further comprises a second spring seat provided so as to be rotatable integrally with the second spring and configured to support the remaining side of the second spring, and a second spring bearing installed between the case and the second spring seat so as to make the second spring seat rotatable with reference to the case.

8. The vehicle height adjustment apparatus of claim 7, wherein the driving module further comprises a case bearing installed between the screw nut and an inner side of the case.

9. The vehicle height adjustment apparatus of claim 8, wherein the case bearing comprises a first case bearing and a second case bearing, and the motor is installed inside the case and disposed between the first case bearing and the second case bearing.

10. The vehicle height adjustment apparatus of claim 7, wherein the driving module further comprises a seat bearing interposed between the case and the second spring seat so as to reduce friction.

11. The vehicle height adjustment apparatus of claim 1, further comprising:
    a top mount bearing installed below the top mount and connected to the remaining side of the first spring.

12. The vehicle height adjustment apparatus of claim 11, further comprising:
    a first spring seat installed below the top mount bearing so as to support the remaining side of the first spring, and
    a dust cover having one side connected to the first spring seat and a remaining side located adjacent to an outer surface of the driving module.

13. The vehicle height adjustment apparatus of claim 12, wherein the dust cover is provided in a bellows shape so as to prevent external foreign matter from infiltrating into a contact portion between the driving module and the piston rod.

14. The vehicle height adjustment apparatus of claim 1, wherein the second spring has a diameter different from a diameter of the first spring.

15. The vehicle height adjustment apparatus of claim 1, wherein the second spring is provided as a helical coil spring disposed inside the first spring to surround the shock absorber and the piston rod.

16. The vehicle height adjustment apparatus of claim 1, wherein the first spring is provided as a helical coil spring so as to surround the shock absorber and the piston rod.

17. The vehicle height adjustment apparatus of claim 1, wherein a diameter of a central portion of the first spring is larger than diameters of opposite end portions of the first spring.

* * * * *